April 17, 1951 T. J. ADDISON 2,549,152
REEL CARRIER
Filed Dec. 5, 1949
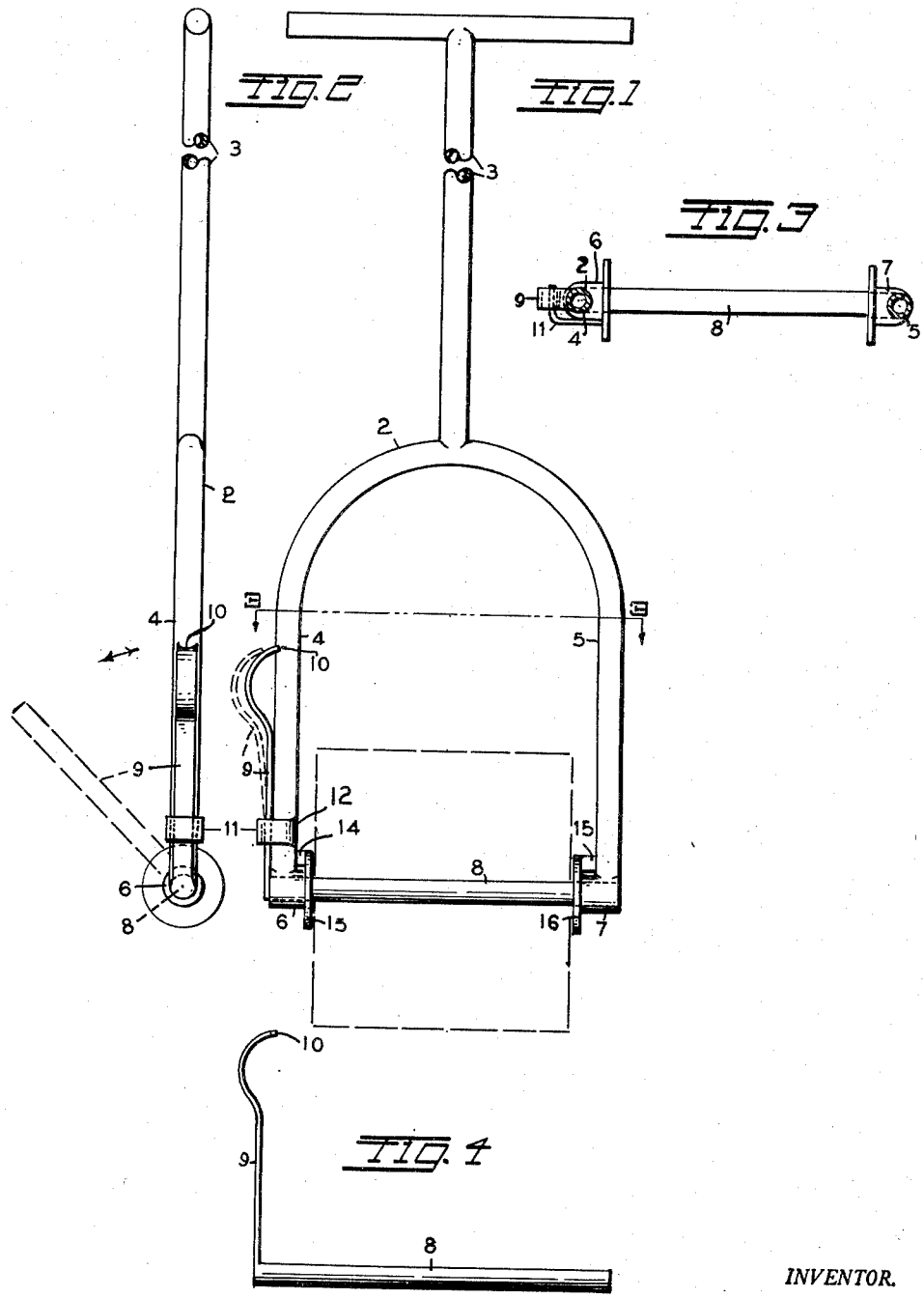
INVENTOR.
THOMAS J. ADDISON
BY
Edward M Fisher
ATTY.

Patented Apr. 17, 1951

2,549,152

UNITED STATES PATENT OFFICE 2,549,152

REEL CARRIER

Thomas J. Addison, Kissimmee, Fla.

Application December 5, 1949, Serial No. 131,220

1 Claim. (Cl. 242—94)

This invention relates to a tool of the kind adapted to carry a spool of cordage, wire, or other item applicable to the same, and to string spooled material.

Of primary interest to applicant is the stringing of barb wire during the erecting of a fence, where the normal method calls for fastening a loose wire end to a post, stake or other suitable item, running a pipe thru the core of the spool and a man on each end of the pipe to carry and string the wire. Such means from a labor standpoint is expensive and also very cumbersome, especially in the crossing of swamps, penetrating timber land, and similar difficulties, therefore, the primary object of this invention is to provide a simple inexpensive tool, operable by one person thereby reducing labor cost, and whereby after the usual fastening of a wire end the spool is freely rolled on the ground for wire stringing.

Other and further objects will appear as the description proceeds.

This invention resides substantially in the combination, construction, arrangement, and relative location of parts, all in accordance with the disclosure herein.

In the accompanying drawings,

Figure 1 is a side elevation of the invention.

Figure 2 an edge view thereof.

Figure 3 a section on line 3—3, Figure 1.

Figure 4 a detail of the shaft member of this invention with handling and locking arm formed therewith, lateral to one end thereof.

The true nature and manner of use of a tool in accordance with this invention will be best understood by a detailed description of the form thereof, shown in the drawings in an illustrative sense.

Now referring more particularly to the drawings, which illustrate my preferred form of structure, same teaches that the invention comprises a substantially yoke-shaped frame 2 with a handle member 3, of tubular material, and forming spaced parallel supporting limbs 4 and 5 having terminating bearings 6 and 7, respectively, for opposite ends of horizontal shaft 8 extending thru both of said bearings. Shaft 8 is extended outward from bearing 6 to accommodate handling and locking arm 9 of springy material and made integral with said shaft by welding or similar means and extended lateral thereto. Outer end of arm 9 is hook shaped and outer edge concaved 10 on a radius coinciding with the radius of tubular limb 4 for locking engagement of said arm with the outer periphery thereof, said hook shape also providing means for grasping same for pulling withdrawal of arm 9 from locking engagement with limb 4, as shown in dotted lines in Figure 1.

Locking engagement of arm 9 with limb 4 is maintained by an angular keeper member 11, one face of which is welded or otherwise placed in fixed engagement with limb 4 a short distance above the bearing member thereof, as at 12, angular portion thereof being positioned to urge arm 9 to engagement with limb 4.

In use, the spool which is designated in dash lines in Figure 1, is installed on shaft 8 after same is unlocked by pulling the hook end of arm 9 outward from peripherical engagement with limb 4, swinging said arm free of keeper 11, as designated in dash lines in Figure 2, and then, by means of arm 9 as a handling means removing shaft 8 from its bearing engagement for intercepting limbs 4 and 5 with said spool then replacing said shaft including extending same thru the spool core.

When placed on said shaft the spool is prevented from lateral displacement thereof by disklike members 15 and 16, having apertures central thereto and of suitable size for passage of shaft 8 therethru, said disks being in fixed engagement with the bearing terminals 6 and 7, respectively, including web welds 14 and 15 respectively.

From the above description it will be apparent to those skilled in the art that the details of construction illustrated herein may readily be varied without departure from the novel subject matter herein disclosed. I do not, therefore, desire to be strictly limited by the disclosure but rather by the claims granted me.

What is claimed:

A portable hand tool having a handle for carrying a spool of material, comprising: a double arm yoke at one end of the handle forming spaced parallel supporting limbs effecting a continuation of the said handle, axle bearings at the free ends of the limbs, a shaft forming an axle removably journaled in said bearings, a tensioned turning arm joined with the axle outside of the yoke and having an outwardly bulged notched latching extremity for releasably interfitting the limb adjacent thereto when said arm radially coincides with the same in overriding contact, and an arm receiving hook-like keeper on said limb adjacent to said arm for holding the latch extremity in pressed engagement under tension with the arm when they coincide with each other and interfitted and also to prevent turning of the latter in but one direction for the releasing of the latch extremity.

THOMAS J. ADDISON.

REFERENCES CITED

The following references are of record in the file of this patent:

UNITED STATES PATENTS

| Number | Name | Date |
|---|---|---|
| 610,494 | Nelson | Sept. 6, 1898 |
| 877,254 | Swanson | Jan. 21, 1908 |
| 1,301,189 | Steen | Apr. 22, 1919 |
| 1,707,378 | Warner | Apr. 2, 1929 |